Patented Mar. 29, 1938

2,112,381

UNITED STATES PATENT OFFICE

2,112,381

STABILIZED PARASITICIDAL COMPOSITIONS

Paul L. Salzberg, Wilmington, Del., assignor, by mesne assignments, to E. I. du Pont de Nemours & Company, Wilmington, Del., a corporation of Delaware No Drawing. Application January 6, 1936, Serial No. 57,765

9 Claims. (Cl. 167—30)

The present invention relates to parasiticidal compositions which contain as an active toxic ingredient a thio-diarylamine and a substance which counteracts the atmospheric inactivation of said toxic ingredient.

Thio-diarylamines have lately been shown to have exceedingly valuable toxic properties towards lower forms of life, especially towards insects, and they have been shown to be very efficient stomach poisons for various insect pests.

Parasiticidal compositions which, for their efficiency, depend upon the toxicity of thio-diarylamines contained therein suffer, however, from the serious drawback that their toxicity and efficiency greatly diminish when the agents are exposed to atmospheric conditions.

I have found that this atmospheric inactivation can be decreased or nearly prevented if the thio-diarylamine parasiticidal composition contains in intimate distribution, a substance which in contact with thio-diphenylamine inhibits such changes in thio-diphenylamine which discolor it and bring its color toward the short wave length end of the spectrum.

When pure thio-diphenylamine, either in substance or solution, is exposed to the atmosphere, its color turns gradually green. I have also found that this discoloration is observed on impure, technical thio-diphenylamines which are of yellowish or brownish color, in all instances the color changes to one of shorter wave length. This change in the thio-diphenylamine can be greatly accelerated for instance by traces of ferric chloride added, for instance, to an acetone solution of thio-diphenylamine I have observed that the change of the thio-diphenylamine from yellow toward green greatly affects its toxicity towards lower forms of life such as insects, in that a greenish thio-diphenylamine has considerably less activity as a parasiticide than the original yellow product which, on exposure to the atmosphere, was discolored.

I have found that when this discoloration is inhibited, the activity of the thio-diarylamines is preserved. I have further made the surprising discovery that if the green discoloration is prevented entirely, the initial toxicity of thio-diphenylamine is materially reduced. It appears as if the toxicity is at least partly due to the ability of thio-diphenylamine to oxidize, but on the other hand the rate of oxidation must be controlled in order to render the product active over a sufficiently long period of time. It will be recognized, therefore, that the problem is not one of simply preventing atmospheric decomposition but rather the more complex problem of controlling the rate of decomposition.

Suitable inhibition of discoloration and inactivation of the thio-diarylamines is produced by chemical substances of various constitutions. Some of such substances are known to act as anti-oxidants in the preservation of rubber, others act as anti-gumming agents for petroleum distillates, but their activity in the present invention does not always run parallel with their activities in such other fields.

Some of the outstanding inactivation inhibitors belong to two types of chemical substances, but these groups are not all embracing as not every member of these groups will be found sufficiently active to be of practical interest, and on the other hand, active inhibitors, such as hydrazine or phenylhydrazine, have been found which can not be classed within these groups. To define inactivation inhibitors useful in my invention I prefer, therefore, to rely upon a discoloration test.

These main groups comprise:

Aromatic phenolic compounds and aromatic amines.

To determine if a given substance is useful as an inactivation inhibitor, I mix a small amount, for instance 5%, of such a substance with thio-diphenylamine and expose the mixture to the atmosphere. Thio-diphenylamine, which is originally of a yellowish color, appears somewhat green on the surface of the sample in about two weeks' time and is very green after two months' exposure under winter conditions. It turns green very much more rapidly in direct summer sunlight.

In a greatly accelerated discoloration test I use an acetone solution of thio-diphenylamine and add to such a solution a few drops of ferric chloride solution. In the absence of a substance of such character, and in such amount as to inhibit inactivation of the thio-diphenylamine, the acetone solution turns immediately green or other shade of short wave length, whereas the solution maintains substantially its color, or simply turns yellowish or brownish, or changes to colors of longer wave length than the original solution, if the solution contains a sufficient amount of substance which will inhibit inactivation.

Substances which I found to prevent discoloration of thio-diphenylamine to colors of shorter wave length have, for instance, been found as follows:

| Substance | Concentration in respect to thio-diphenylamine | Exposure time | Test exposure appearance |
|---|---|---|---|
| | Per cent | | |
| Thio-diphenylamine alone | | 2 weeks | Green on surface |
| Hydroquinone | 1 | 6 months | Sl. red on surface |
| Hydroquinone | 0.5 | 4½ months | Red on surface |
| Hydroquinone | 2 | do | Do. |
| Beta naphthol | 5 | 2½ months | Very little change |
| Mono-lauryl ether of hydroquinone | 1 | do | Sl. brown on surface |
| p-Hydroxyphenyl-morpholine | 1 | do | Brown on surface |
| Mono-benzyl-p-amino phenol | 1 | do | Do. |
| Diphenyl-guanidine | 1 | do | Red on surface |
| Lauryl catechol | 1 | do | Brown on surface |
| Tannic acid | 1 | do | Do. |

In the above described accelerated ferric chloride discoloration tests I found, for instance the same substances quite effective for prevention of color change in thio-diphenylamine solutions towards the blue end of the spectrum.

The exposure test and the accelerated ferric chloride test give entirely parallel results, except in some cases with phenolic inhibitors where the phenols or naphthols may react with the ferric chloride to produce deeply colored compounds, but in the case of amines and other non-phenolic materials, I found that the accelerated ferric chloride test gives a safe guide for predicting the effect of a certain compound to inhibit the inactivation of the parasiticidal value of a thio-diarylamine.

The effect of these discoloration inhibitors of prolonging the potency of thio-diarylamine parasiticides is made use of by intimately mixing these substances in small amounts, for instance, from 1 to 10% with the parasiticidal compositions, as for instance, the aqueous sprays containing the usual spreading and wetting agents or by incorporating into the dry dusts the thio-diarylamine, the requisite amount of inhibitor and the usual diluents such as talc, silica powders, etc. and then applying such compositions in a conventional manner to the plants to be protected from parasiticidal attacks. The thio-diarylamine insecticides which are amenable to the effect of my novel inactivation inhibitors are water insoluble compounds of the general formula

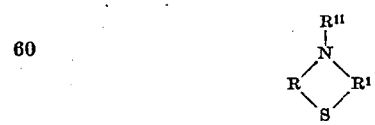

in which R and R¹ are aromatic nuclei and R¹¹ is hydrogen.

The proto type of these compounds is thio-diphenylamine, which is produced, for instance, by heating diphenylamine with sulfur in the presence of a catalyst, such as aluminum choride, ferric chloride, iodine, etc.

Other members of the novel group of insecticides, according to my invention, are the thio compounds obtained by the action of sulfur upon diarylamines such as, for instance, those obtained from phenyl-alpha-naphthyl amine which presumably has the formula

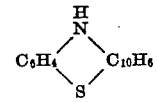

or from phenyl-beta-naphthylamine, di-alpha-naphthylamine,
di-beta-naphthylamine,
di-biphenylamine,
N, N-diphenyl-p-phenylenediamine,
N, N-di-alpha-naphthyl-para phenylene-diamine,
N, N - di - biphenyl - metaphenylene-diamine,
N, N-di-phenyl-metaphenylene-diamine,
N, N-di-phenyl-benzidine,
p, p'-di-(phenyl-amino) di-phenylamine.

The thio derivatives obtained from these diarylamines are all characterized by containing the heterocyclic nucleus

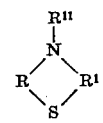

in which R and R¹ are aromatic nuclei in each of which two adjacent carbon atoms take part in forming the heterocyclic carbon-nitrogen-sulfur ring, and R¹¹ is hydrogen.

Some of the hydrogen atoms normally attached to R and R¹ may be substituted, or replaced by alkyl, cyclo-alkyl, aryl, hetero-cyclic nuclei, or halogen, nitro, amino, alkoxy or aryloxy groups.

Among the novel inactivation inhibitors of my invention, I prefer to use those which are insoluble or difficultly soluble in water.

The inhibitor may be ground together with the thio-diarylamine whereby an intimate mixture of the two is obtained. I also may incorporate the inhibitor into the parasiticide by means of a common solvent for the two with subsequent evaporation of the solvent. Furthermore, and particularly in the case of thio-diphenylamine I might add the inhibitor, if stable under such conditions, to the molten thio-diphenylamine at the conclusion of the sulfurization of diphenylamine.

The substances which were found to inhibit the discoloration of thio-diphenylamine were also found to inhibit the inactivation of the thio-diarylamines when exposed to atmospheric conditions, for instance, when in contact with air under such conditions as exist when the parasiticidal compositions are applied to plants, etc.

In order to illustrate the magnitude and type of protection obtained by the use of my invention, I am giving the following specific case where I achieved the maintenance of biological activity in thio-diphenylamine.

| Composition | Outdoor exposure | Per cent kill of Mexican bean beetle by 5% dust on talc |
|---|---|---|
| Pure thio-diphenylamine | None | 100 |
| Pure thio-diphenylamine | 6 weeks | 40 |
| Pure thio-diphenylamine+1% hydroquinone | None | 90 |
| Pure thio-diphenylamine+1% hydroquinone | 6 weeks | 70 |

It is seen from this that while pure thio-diphenylamine lost 60% of its activity after six weeks atmospheric exposure, the addition thereto of 1% hydroquinone reduced this loss of activity to about 22%.

In another set of tests apples were sprayed with a parasiticidal composition at the rate of three pounds per 100 gallons, they were then exposed to sunlight and air for five days and infected with codling moth. Apples freshly sprayed with the spray were immediately infected and the results are tabulated below:

| Composition | Per cent control | | Per cent loss of initial efficiency | Per cent improvement over unstabilized mat. |
|---|---|---|---|---|
| | Apples freshly sprayed and immediately infected (initial activity) | Apples infected five days after spray | | |
| Technical thio-diphenyl amine 99 pts. Wetting agent 1 pt. | 88 | 53 | 40 | |
| Technical thio-diphenyl amine 94 pts. Wetting agent 1 pt. Beta-naphthol 5 pts. | 79 | 80 | | 50 |

The term "antioxidant" as used in the appended claims is not intended to be restricted to substances which act as antioxidants in the preservation of rubber, but is to be interpreted according to its broader significance as comprehending in addition thereto not only substances which act as anti-gumming agents for petroleum distillates but also substances which, in the broad sense of the term "antioxidant", would be so classified by those skilled in the various chemical arts.

I claim:

1. A parasiticidal composition stabilized against atmospheric inactivation comprising as the active parasiticidal ingredient a thio-diarylamine and an antioxidant which inhibits the discoloration of thio-diphenylamine toward the short wave length of the spectrum when ferric chloride is added in a small amount to an acetone solution of thio-diphenylamine containing a small amount of said antioxidant, said antioxidant being present in such an amount as to retard atmospheric inactivation of thio-diarylamine.

2. A parasiticidal composition, stabilized against atmospheric inactivation, comprising, as the active parasiticidal ingredient, a thio-diarylamine and, as the stabilizer, from about 1 to 10% of an antioxidant which, when present in an acetone solution of thio-diphenylamine, prevents the color of said solution from changing to a shorter wave length on addition of ferric chloride thereto.

3. A parasiticidal composition stabilized against atmospheric inactivation comprising as the active parasiticidal ingredient a thio-diphenylamine and a phenolic compound which has the property of inhibiting the discoloration of thio-diphenylamine toward the short wave length of the spectrum when exposed to atmospheric conditions in admixture with said substance, said phenolic compound being present in such an amount as to retard atmospheric inactivation of thio-diphenylamine.

4. A parasiticidal composition, stabilized against atmospheric inactivation, comprising, as the active parasiticidal ingredient, a thio-diarylamine and, as the stabilizer, from about 1 to 10% of a phenolic compound which, when present in an acetone solution of thio-diphenylamine, prevents the color of said solution from changing to a shorter wave length on addition of ferric chloride thereto.

5. An insecticidal composition stabilized against atmospheric inactivation comprising thio-diphenylamine and beta-naphthol in such an amount as to retard atmospheric inactivation of thio-diphenylamine.

6. An insecticidal composition stabilized against atmospheric inactivation comprising thio-diphenylamine and hydroquinone in such an amount as to retard atmospheric inactivation of thio-diphenylamine.

7. The composition of claim 1 in which said antioxidant is an aromatic amine.

8. A parasiticidal composition, stabilized against atmospheric inactivation, comprising, as the active parasiticidal ingredient, a thio-diarylamine and, as the stabilizer, from about 1 to 10% of an aromatic amine which, when present in an acetone solution of thio-diphenylamine, prevents the color of said solution from changing to a shorter wave length on addition of ferric chloride thereto.

9. An insecticidal composition stabilized against atmospheric inactivation comprising thio-diphenylamine and diphenyl guanidine in such an amount as to retard atmospheric inactivation of thio-diphenylamine.

PAUL L. SALZBERG.